United States Patent
Andre et al.

(10) Patent No.: US 11,366,730 B2
(45) Date of Patent: *Jun. 21, 2022

(54) DETERMINING AN AVAILABILITY SCORE BASED ON AVAILABLE RESOURCES AT A FIRST SERVER TO DETERMINE WHETHER TO DIRECT PROCESSING FROM A FIRST SERVER TO A SECOND SERVER

(71) Applicant: International Business Machines Corporation, Armonk, NY (US)

(72) Inventors: Herve G. P. Andre, Orlando, FL (US); Matthew D. Carson, Encino, CA (US); Rashmi Chandra, Santa Clara, CA (US); Clint A. Hardy, Tucson, AZ (US); Larry Juarez, Tucson, AZ (US); Tony Leung, Tucson, AZ (US); Todd C. Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 16/677,647

(22) Filed: Nov. 7, 2019

(65) Prior Publication Data

US 2020/0073772 A1  Mar. 5, 2020

Related U.S. Application Data

(63) Continuation of application No. 15/792,751, filed on Oct. 25, 2017, now Pat. No. 10,528,441, which is a
(Continued)

(51) Int. Cl.
*G06F 11/00* (2006.01)
*G06F 11/20* (2006.01)
(Continued)

(52) U.S. Cl.
CPC ........ *G06F 11/2094* (2013.01); *G06F 11/008* (2013.01); *G06F 11/203* (2013.01);
(Continued)

(58) Field of Classification Search
None
See application file for complete search history.

(56) References Cited

U.S. PATENT DOCUMENTS 7,003,564 B2  2/2006  Greuel et al.
7,877,644 B2  1/2011  Stenzel
(Continued)

OTHER PUBLICATIONS

Google Scholar/Patents—text refined (Year: 2021).*
(Continued)

*Primary Examiner* — Christopher S McCarthy
(74) *Attorney, Agent, or Firm* — Konrad Raynes Davda & Victor LLP; David W. Victor

(57) ABSTRACT

Provided are a computer program product, system, and method for a computer program product, system, and method for determining an availability score based on available resources of different resource types in a distributed computing environment of storage servers to determine whether to perform a failure operation for one of the storage servers. A health status monitor program deployed in the storage servers performs: maintaining information indicating availability of a plurality of storage server resources for a plurality of resource types; calculating an availability score as a function of a number of available resources of the resource types; and transmitting information on the availability score to a management program. The management program uses the transmitted information to determine whether to migrate services from the storage server from which the availability score is received to at least one of the other storage servers in the distributed computing environment.

15 Claims, 11 Drawing Sheets

Related U.S. Application Data continuation of application No. 15/206,093, filed on Jul. 8, 2016, now Pat. No. 9,946,618, which is a continuation of application No. 14/289,333, filed on May 28, 2014, now Pat. No. 9,411,698.

(51) Int. Cl.
G06F 11/30 (2006.01)
G06F 11/34 (2006.01)

(52) U.S. Cl.
CPC ...... *G06F 11/2069* (2013.01); *G06F 11/3034* (2013.01); *G06F 11/3495* (2013.01); *G06F 11/2071* (2013.01); *G06F 2201/805* (2013.01)

(56) References Cited

U.S. PATENT DOCUMENTS

| | | | |
|---|---|---|---|
| 8,296,772 B2 | 10/2012 | Bulfin | |
| 8,467,688 B2 | 6/2013 | Archambault et al. | |
| 8,578,127 B2 | 11/2013 | Thatcher et al. | |
| 9,158,674 B2 | 10/2015 | Verhaeghe et al. | |
| 9,215,158 B1 | 12/2015 | Adogla et al. | |
| 9,411,698 B2 | 8/2016 | Andre et al. | |
| 9,703,619 B2 | 7/2017 | Andre et al. | |
| 9,946,618 B2 | 4/2018 | Andre et al. | |
| 2006/0136701 A1 | 6/2006 | Dickinson | |
| 2009/0112809 A1 | 4/2009 | Wolff et al. | |
| 2009/0177720 A1 | 7/2009 | Shitomi et al. | |
| 2010/0192196 A1 | 7/2010 | Lee | |
| 2010/0325273 A1 | 12/2010 | Kudo | |
| 2014/0032768 A1 | 1/2014 | Ding et al. | |
| 2014/0143828 A1 | 5/2014 | Sobel et al. | |
| 2014/0173130 A1 | 6/2014 | Uluderya et al. | |
| 2014/0344874 A1 | 11/2014 | Olsen | |
| 2015/0200824 A1 | 7/2015 | Sadovsky et al. | |
| 2015/0256621 A1 | 9/2015 | Noda et al. | |
| 2015/0295790 A1 | 10/2015 | Cropper et al. | |
| 2015/0304414 A1 | 10/2015 | Jasperson, Jr. et al. | |
| 2015/0333988 A1 | 11/2015 | Jalan et al. | |
| 2015/0347245 A1 | 12/2015 | Andre et al. | |
| 2015/0347252 A1 | 12/2015 | Andre et al. | |
| 2016/0321152 A1 | 11/2016 | Andre et al. | |
| 2018/0060200 A1 | 3/2018 | Andre et al. | |

OTHER PUBLICATIONS

Google Scholar/Patents—text refined (Year: 2022).*
U.S. Appl. No. 14/289,320, filed May 28, 2014.
Office Action dated Dec. 15, 2015, pp. 16, for U.S. Appl. No. 14/289,320, filed May 28, 2014-05-28.
Response dated Mar. 14, 2016, pp. 14, to Office Action dated Dec. 15, 2015, pp. 16, for U.S. Appl. No. 14/289,320, filed May 28, 2014.
Final Office Action dated Apr. 14, 2016, pp. 15, for U.S. Appl. No. 14/289,320, filed May 28, 2014.
Response dated Jul. 5, 2016, pp. 13, to Final Office Action dated Apr. 14, 2016, pp. 15, for U.S. Appl. No. 14/289,320, filed May 28, 2014.
Office Action dated Oct. 18, 2016, pp. 19, for U.S. Appl. No. 14/289,320, filed May 28, 2014.
Response dated Jan. 18, 2017, pp. 12, to Office Action dated Oct. 18, 2016, pp. 19, for U.S. Appl. No. 14/289,320, filed May 28, 2014.
Notice of Allowance dated Mar. 1, 2017, pp. 9, for U.S. Appl. No. 14/289,320, filed May 28, 2014.
U.S. Appl. No. 14/289,333, filed May 28, 2014.
Office Action dated Dec. 15, 2015, pp. 13, for U.S. Appl. No. 14/289,333, filed May 28, 2014.
Response dated Mar. 14, 2016, pp. 14, to Office Action dated Dec. 15, 2015, pp. 13, for U.S. Appl. No. 14/289,333, filed May 28, 2014.
Notice of Allowance dated Apr. 18, 2016, pp. 13, for U.S. Appl. No. 14/289,333, filed May 28, 2014.
U.S. Appl. No. 15/206,093, filed Jul. 8, 2016.
Office Action dated Feb. 27, 2017, pp. 15, for U.S. Appl. No. 15/206,093, filed Jul. 8, 2016.
Amendment dated May 30, 2017, pp. 8, to Office Action dated Feb. 27, 2017, pp. 15, for U.S. Appl. No. 15/206,093, filed Jul. 8, 2016.
Notice of Allowance dated Jul. 25, 2017, pp. 9, for U.S. Appl. No. 15/206,093, filed Jul. 8, 2016.
Amendment filed Oct. 20, 2017, pp. 7, for U.S. Appl. No. 15/206,093, filed Jul. 8, 2016.
Notice of Allowance dated Nov. 28, 2017, pp. 9, for U.S. Appl. No. 15/206,093, filed Jul. 8, 2016.
U.S. Appl. No. 15/792,751 filed Oct. 24, 2017.
Office Action dated Mar. 19, 2019, pp. 13, for U.S. Appl. No. 15/792,751.
Response dated Jun. 19, 2019, pp. 7, to Office Action dated Mar. 19, 2019, pp. 13, for U.S. Appl. No. 15/792,751.
Notice of Allowance dated Aug. 30, 2019, pp. 7, to U.S. Appl. No. 15/792,751.
Preliminary Amendment dated Jul. 8, 2016, pp. 10, for U.S. Appl. No. 15/206,093.
Preliminary Amendment dated Oct. 24, 2017, pp. 7, for U.S. Appl. No. 15/792,751.
List of IBM Patents or Patent Applications Treated as Related, pp. 2, dated Nov. 7. 2019.

* cited by examiner

Resource Availability Information

Health Status Information

DETERMINING AN AVAILABILITY SCORE BASED ON AVAILABLE RESOURCES AT A FIRST SERVER TO DETERMINE WHETHER TO DIRECT PROCESSING FROM A FIRST SERVER TO A SECOND SERVER

BACKGROUND OF THE INVENTION

1. Field of the Invention

The present invention relates to a computer program product, system, and method for determining an availability score based on available resources of different resource types in a distributed computing environment of storage servers to determine whether to perform a failure operation for one of the storage servers.

2. Description of the Related Art

A storage server in a data storage environment may send a health status message to a manager of the storage environment which can cause the storage manager to swap operations to a secondary storage system mirroring data from the primary storage system sending the health message. For instance, in the International Business Machine Corporation's ("IBM") Geographically Dispersed Parallel Sysplex® (GDPS)® storage system, a high severity message may cause a failover or hyperswap operation. HyperSwap® is an IBM product that provides continuous availability for disk failures by maintaining synchronous copies of all primary disk volumes on one or more primary storage systems to one or more target (or secondary) storage systems. (HyperSwap and GDPS are registered trademarks of IBM in countries throughout the world). When a disk failure is detected, code in the operating system identifies HyperSwap managed volumes and instead of failing the I/O request, HyperSwap switches (or swaps) information in internal control blocks so that the I/O request is driven against the secondary volume. Since the secondary volume is an identical copy of the primary volume prior to the failure, the I/O request will succeed with no impact to the program issuing the I/O request, which could be an application program or part of the operating system. This therefore masks the disk failure from the program and avoids an application and/or system outage. An event which causes a HyperSwap to be initiated is called a "swap trigger".

SUMMARY

Provided are a computer program product, system, and method for determining an availability score based on available resources of different resource types in a storage system to determine whether to perform a failure operation for the storage system. Information is maintained indicating availability of a plurality of storage system resources for a plurality of resource types. An availability score is calculated as a function of a number of available resources of the resource types. Information on the availability score is transmitted to a failure manager. The failure manager uses the transmitted availability information to determine whether to initiate a storage system failure mode for the storage system.

Further provided are a computer program product, system, and method for a computer program product, system, and method for determining an availability score based on available resources of different resource types in a distributed computing environment of storage servers to determine whether to perform a failure operation for one of the storage servers. A health status monitor program deployed in the storage servers performs: maintaining information indicating availability of a plurality of storage server resources for a plurality of resource types; calculating an availability score as a function of a number of available resources of the resource types; and transmitting information on the availability score to a management program. The management program uses the transmitted information to determine whether to migrate services from the storage server from which the availability score is received to at least one of the other storage servers in the distributed computing environment.

DETAILED DESCRIPTION

Described embodiments provide techniques for generating an availability score that is cumulative with respect to the availability of resources for different resource types in the system in response to an error event. In this way, the availability score that may be used to determine a failure operation considers the cumulative health of all the resources of different specified resource types, such as resource types required to allow the storage system to maintain access to customer services resources. Further, additional information may be considered in addition to the availability of different resources, such as the number of error recovery or other events, which may impact the availability or health score.

Figure 1:
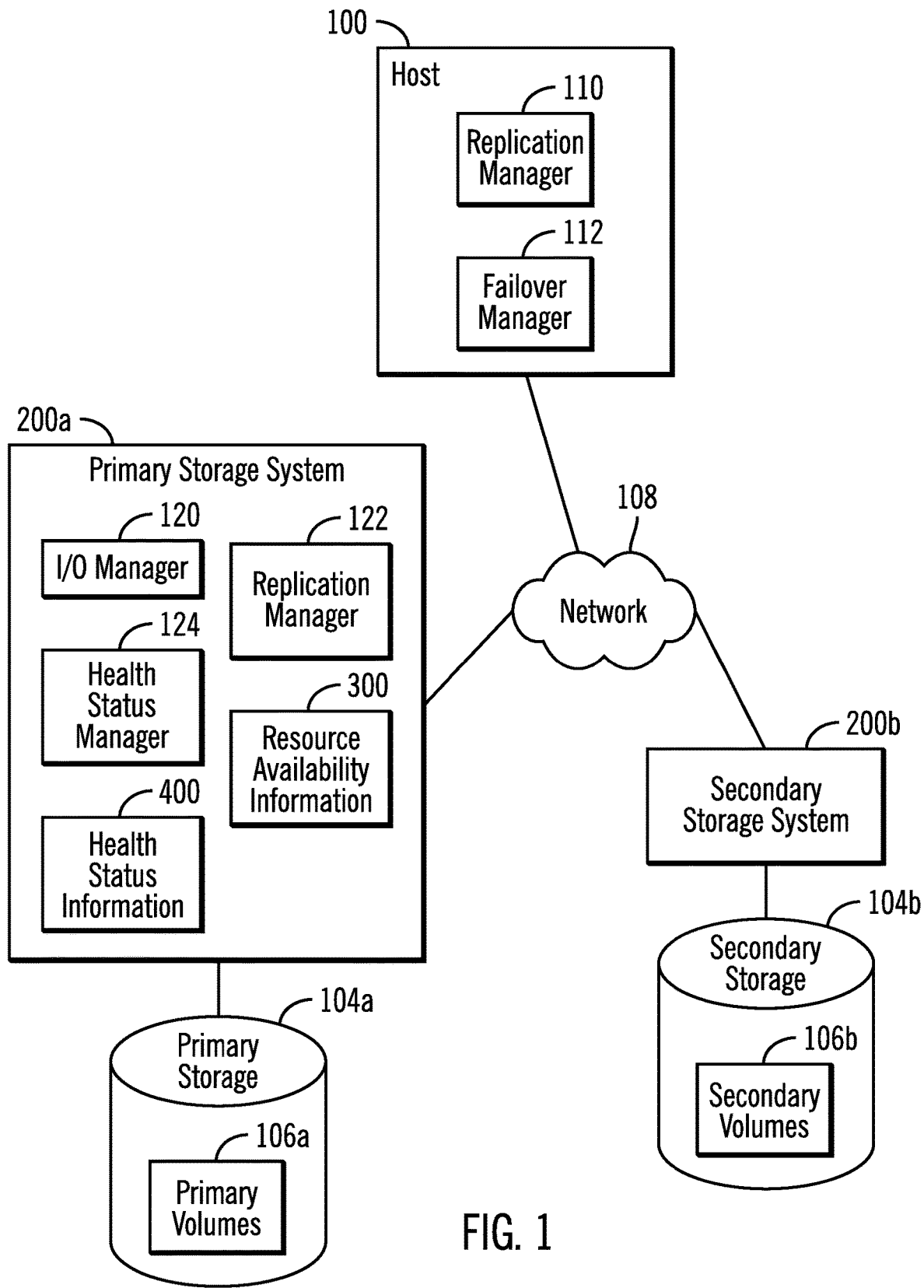
FIG. 1 illustrates an embodiment of a storage environment.

FIG. 1 illustrates an embodiment of a mirror copy storage environment having a host system 100 that is connected to a primary storage system 200*a* and a secondary storage system 200*b* to which data from the primary storage system 200*a* is mirrored. The primary storage system 200*a* is coupled to a primary storage 104*a* having a plurality of primary volumes 106a that are in copy pairs with corresponding secondary volumes 106b in a secondary storage 104b of the secondary storage system 200b. The host 100 and primary 200a and secondary 200b storage systems may communicate over a network 108.

The host system 100 includes a replication manager 110 to mirror data from the primary volumes 106a to the secondary volumes 106b as part of a replication session in which updates to the primary volumes 160a of the primary storage system 200a are continuously mirrored to the secondary volumes 106b. A failover manager 112 may implement a failover from the primary storage system 200a to the secondary storage system 200b in response to a failure event at the primary storage system 200a.

The primary storage system 200a, as well as the secondary storage system 200b, may include an Input/Output ("I/O") manager 120 to manage I/O requests to the primary volumes 106a, a replication manager 122 to handle the mirroring of data form the primary volumes 106a to the secondary volumes 106b, a health status manager 124 to determine an availability or health score for the primary storage system 200a, resource availability information 300 indicating an availability of computational resources of the primary storage system 200a, and health status information 400.

The storage systems 200a, 200b may be comprised of an enterprise storage controller/server suitable for managing access to attached storage devices, such as the International Business Machine Corporation's ("IBM") DS8000® storage system. (DS8000 is a registered trademark of IBM in countries throughout the world).

In one embodiment, the replication manager 110 comprises a program for managing the mirroring of volumes across systems, such as the IBM mirroring programs Geographically Dispersed Parallel Sysplex® (GDPS)®, and Tivoli® Storage Productivity Center for Replication (TPC-R) that define a replication session and copy pairs. Different types of mirroring may be selected to copy the data, such as synchronous mirroring, asynchronous mirroring or point-in-time mirroring, or combinations of multiple of these different mirroring types. The failover manager 112 may comprise a program suitable for handling the failover of the primary storage system 200a to the secondary storage system 200b, such as the IBM HyperSwap product which establishes failover sessions from the established copy pairs. (Geographically Dispersed Parallel Sysplex, GDPS, Tivoli, and HyperSwap are registered trademarks of IBM in countries throughout the world).

In alternative embodiments, the functionality described with respect to the replication manager 110 and failover manager 112 may be implemented in a single storage manager program or in multiple different program modules.

The network 108 may comprise a Storage Area Network (SAN), Local Area Network (LAN), Intranet, the Internet, Wide Area Network (WAN), peer-to-peer network, wireless network, arbitrated loop network, etc. The volumes 106a, 106b may be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. Then storage devices in which the volumes are implemented may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

Figure 2:
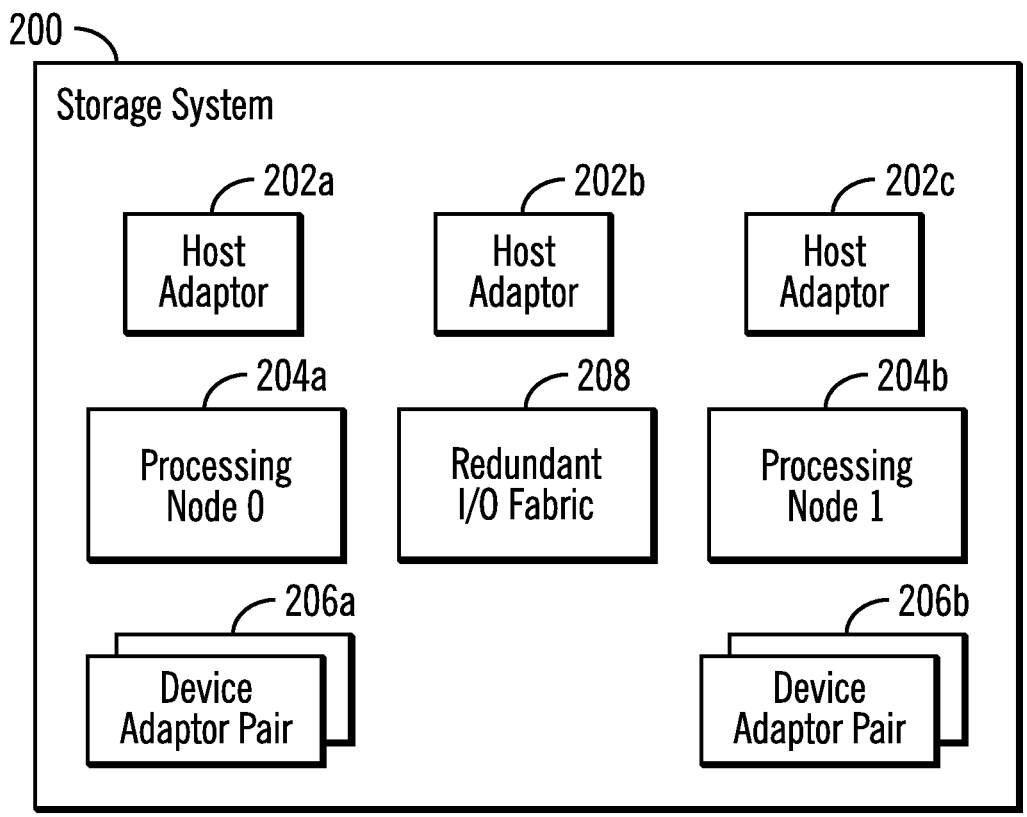
FIG. 2 illustrates an embodiment of resources in a storage system.

FIG. 2 illustrates an embodiment of components in a storage system 200, such as the primary 200a and secondary 200b storage systems. The storage system 200 includes a plurality of different resource types, such as host adaptors 202a, 202b, 202c providing different paths to connect to external hosts; processing nodes 204a, 204b to process I/O requests received at one of the host adaptors 202a, 202b, 202c; device adaptor pairs 206a, 206b that provide connections to attached storage 104a, 104b; and a redundant I/O fabric 208 to connect the different components. If one of multiple redundant resources goes offline or becomes unavailable, then the storage system 200 may still be available because available of the redundant resources provide a path to attached storage devices or other customer resources. However, if all instances of a particular resource type goes down, then the system 200 becomes unavailable because it no longer would provide a path and access to attached storage devices or other storage or computational resources implemented in the storage system 200.

FIG. 2 shows a certain number of different resource types by way of example, but there may be more of the shown resource types and other resource types not shown that are likewise needed for the storage system 200 to be available.

Figure 3:
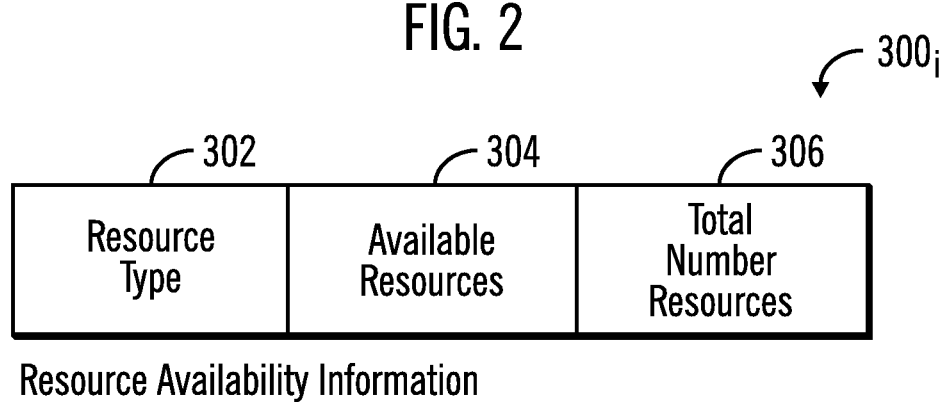
FIG. 3 illustrates an embodiment of resource availability information.

FIG. 3 illustrates an embodiment of an instance 300, of the resource availability information 300, and includes a resource type 302 indicating the resource type; available resources 304 of the resource type 302; and a total number of the resources 306, e.g., resource instances, for the resource type 302. Upon detecting that a resource instance is offline, the health status manager 124 may update the available resources 304 to indicate one less resource is available, such as by decrementing field 304. In alternative embodiments, additional information on the available and unavailable resources may be maintained.

Figure 4:
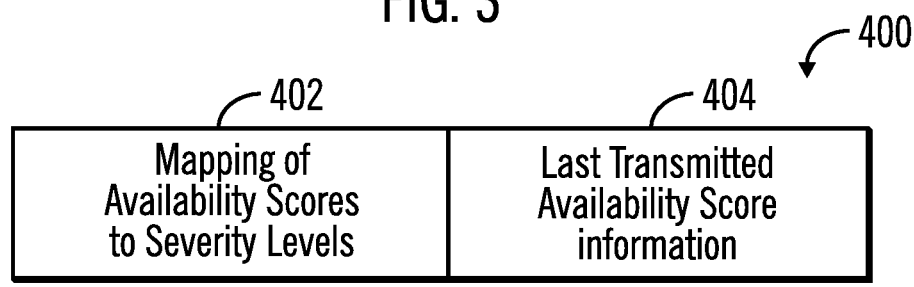
FIG. 4 illustrates an embodiment of health status information.

FIG. 4 illustrates an embodiment of the health status information 400 including a mapping 402 of availability scores to different severity levels and a last transmitted availability score 404.

Figure 5:
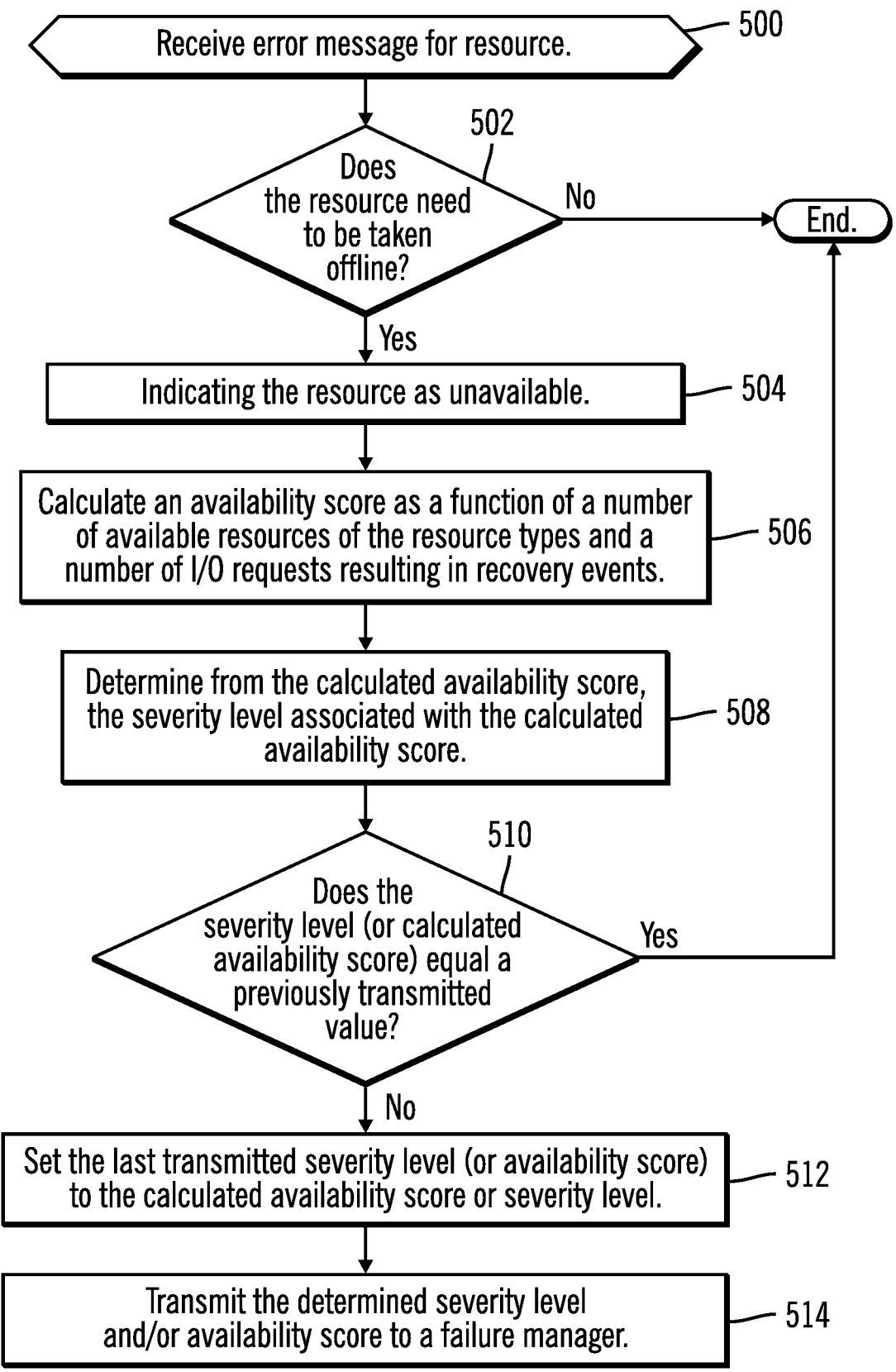
FIG. 5 illustrates an embodiment of operations to process an error message for a resource in a storage system.

FIG. 5 illustrates an embodiment of operations performed by the health status manager 124 to process an error message from a resource, such as the resource types shown in FIG. 2. Upon receiving (at block 500) the error message for a resource, if (at block 502) the error indicates that the resource does not need to be taken offline, such as if the resource is still available, then control ends because that error will not affect availability. Otherwise, if (at block 502) the error indicates the resource will be unavailable, then the health status manager 124 indicates (at block 504) that the resource is unavailable, such as by indicating one less available resource 304, i.e., decrementing the available resources 304 field in the resource availability information 300, for the resource. The health status manager 124 calculates (at block 506) an availability score as a function of a number of available resources of the resource types and a number of I/O requests resulting in recovery events. In this way, the availability of numerous different resources as well as an extent of particular types of events, such as I/O requests resulting in recovery events, are all used to determine an aggregate availability score based on the availability of resources of different resource types and a number of certain type of recovery events that have occurred.

In certain embodiments, the calculated availability score may be used as an indicator of availability. In an alternative embodiment, the health status manager 124 may determine (at block 508) from the calculated availability score, a severity level associated with the calculated availability score. The mapping 402 may provide a mapping of all possible availability scores to different severity levels. In one embodiment, a finite number of ranges of possible availability scores may map to a finite number of severity levels, such as low, medium and high. Other techniques may be used to map availability scores to severity levels.

If (at block 510) the severity level or calculated availability score equals a previously transmitted value 404, then control ends because there has been no change in the health status. If (at block 510) the severity level or availability score has changed, then the health status manager 124 sets (at block 512) the last transmitted availability score information 404 (severity level or availability score) to the determined severity level or calculated availability score. The determined severity level and/or availability score is then transmitted (at block 514) to a failure manager comprising a software program external or internal to the primary storage system 200a that processes the calculated health information and determines the course of action to take.

Figure 6:
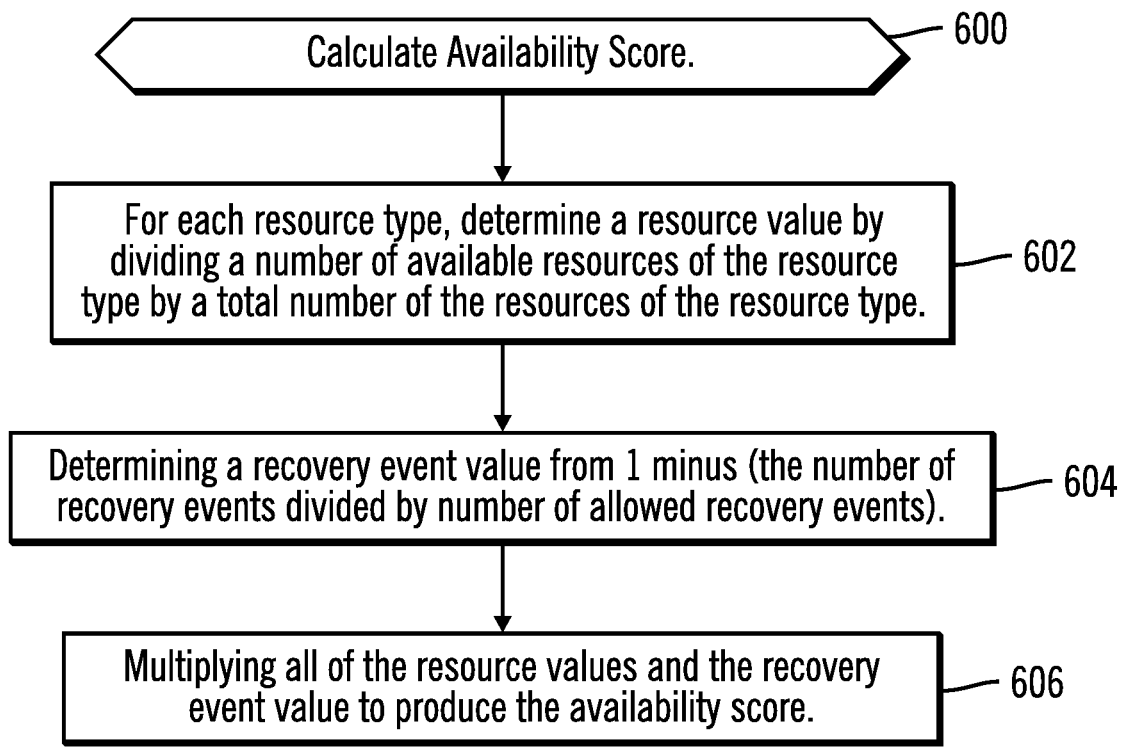
FIG. 6 illustrates an embodiment of operations to calculate an availability score for the storage system producing the error.

FIG. 6 illustrates an embodiment of the operations performed by the health status manager 124 to calculate the availability score, such as performed at block 506 in FIG. 5. Upon calculating (at block 600) the availability score, the health status manager 124 may determine (at block 602), for each resource type, a resource value by dividing a number of available resources of the resource type by a total number of the resources of the resource type. A recovery event value may be determined (at block 604) by calculating one minus (the number of recovery events divided by number of allowed recovery events). All of the determined resource values and the recovery event value may be multiplied (at block 606) together to produce the availability score.

Equation (1) below provides an embodiment of a function used to calculate the availability score.

Availability Score=(Available Number of Nodes 204a,204b)/(Total number of Nodes)*(Available Number of Host Adaptors 202a,202b,202c/Total number of Host Adapters)*(Availability of Device Adaptor Pair 206a)/(2)*(Availability of Device Adaptor Pair 206b/(2)* . . . *(Availability resource $N$)/(Total number resource $N$)*(1−(Number of Recovery Events/Total Allowed Recovery Events)*100   (1)

Equation (1) may consider any number of N resources, including, but not limited, to those shown in FIG. 2 required to maintain access to attached storage 104a, 104b or other server resources.

Figure 7:
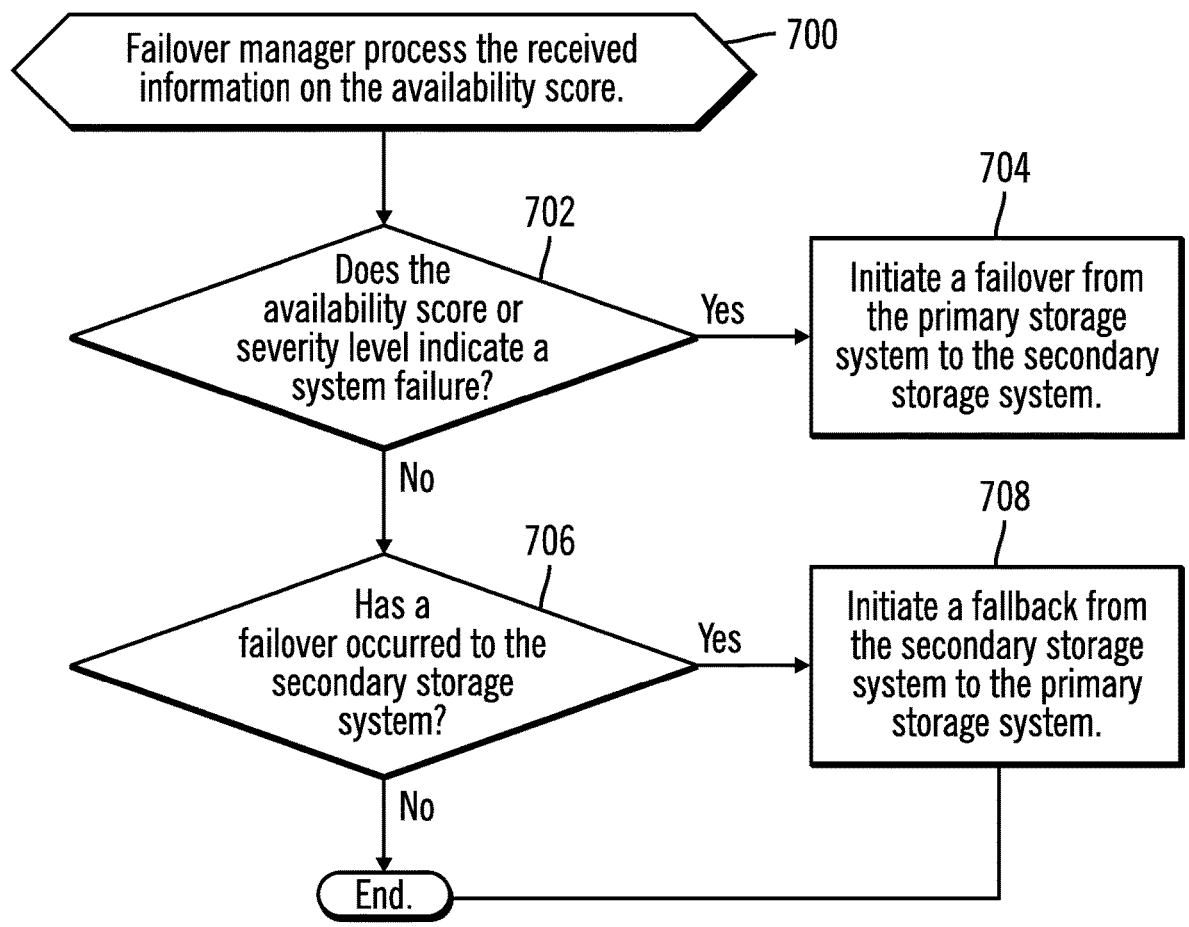
FIG. 7 illustrates an embodiment of operations to process the availability score to determine whether to perform a failover.

FIG. 7 shows an embodiment of operations when the failure manager comprises a failover manager 112 to manage a failover from a failed primary storage system 102a to the secondary storage system 102b to provide immediate continued access to the storage system 102a in its mirrored secondary storage system 102b. Upon the failover manager 112 processing (at block 700) the received availability score information, if (at block 702) the received severity level or availability score indicates a system failure, then a failover is initiated (at block 704) from the primary storage system 200a to the secondary storage system 200b. Otherwise, if (at block 702) the received severity level or availability score does not indicate a system failure, i.e., indicates the primary storage system 102a is available, and if (at block 706) the failover has occurred to the secondary storage system 102b, then the failover manager 112 may initiate (at block 708) a failback from the secondary storage system to the primary storage system. In one embodiment, a system failure may be indicated by an availability score of zero, such as in the equation (1) above, where a zero number of available instances of a resource produces a resource value of zero which results in the availability score being zero as a result of the multiplication with zero.

Figure 8:
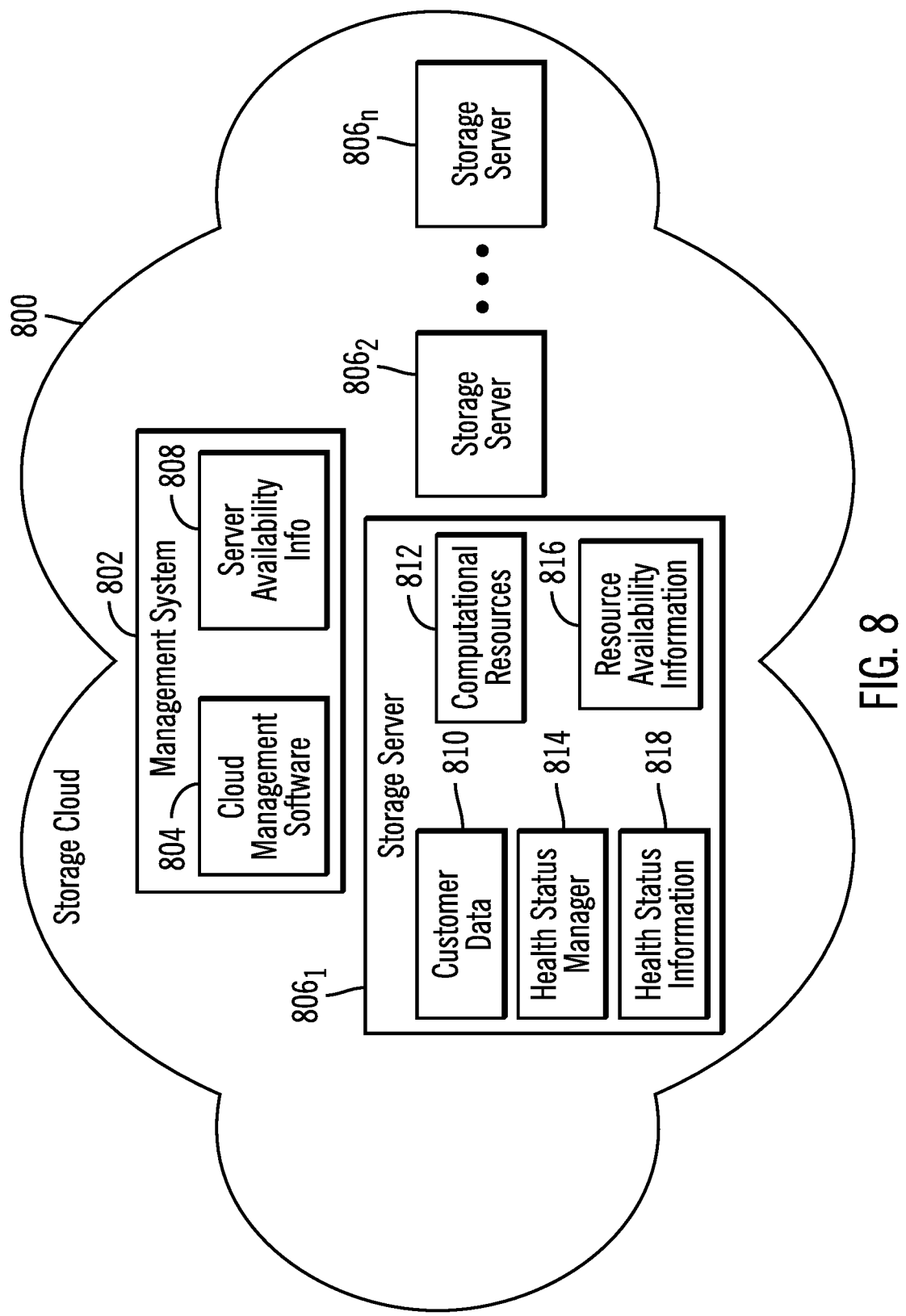
FIG. 8 illustrates an embodiment of cloud computing environment.

FIG. 8 illustrates an additional storage cloud 800 implementation, or distributed computing environment, including a management system 802 having cloud management software 804 to process health related information from storage servers $806_1$, $806_2$ . . . $806_n$ and server availability information 808 having the availability scores or severity levels for each of the servers $806_1$, $806_2$ . . . $806_n$ implementing the cloud 800 services. The storage management system 802 may comprise a separate physical computing system from the storage servers $806_1$, $806_2$ . . . $806_n$ as shown in FIG. 8 or may comprise a virtual machine implemented in one of the storage servers $806_1$, $806_2$ . . . $806_n$.

Each server $806_1$, $806_2$ . . . $806_n$ provides access to customer data 810 and computational services 812 that customers may access for customer applications or that perform internal storage server $806_1$, $806_2$ . . . $806_n$ operations. The storage servers $806_1$, $806_2$ . . . $806_n$ may also include the health status related components, descried above with respect to FIG. 1, including health status manager 814, resource availability information 816, and health status information 818, described above with respect to components 124, 300, and 400, respectively, in FIG. 1. The health status manager 814 in each storage server $806_1$, $806_2$ . . . $806_n$ produces an availability score that the management system 802 stores in server availability information 804 to use to manage the storage servers $806_1$, $806_2$ . . . $806_n$.

Figure 9:
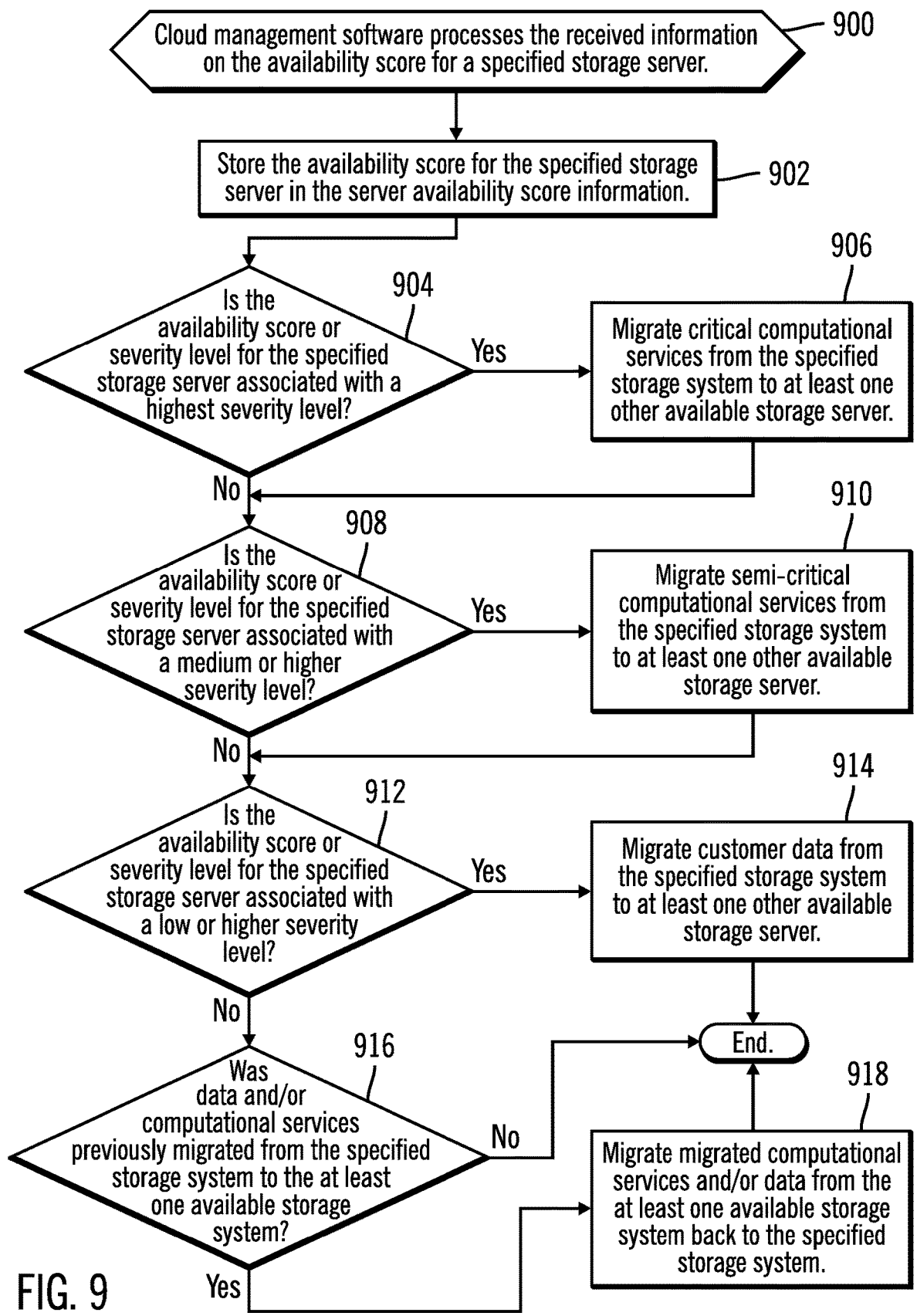
FIG. 9 illustrates an embodiment of operations to process the availability score for a storage server in the cloud environment.

FIG. 9 illustrates an embodiment of operations performed by the cloud management software 804 to manage the storage servers $806_1$, $806_2$ . . . $806_n$ providing the cloud 800 services. Upon receiving (at block 900) an availability score for a specified storage server of the storage servers $806_1$, $806_2$ . . . $806_n$, the cloud management software 804 stores (at block 902) the availability score for the specified storage server in the server availability score information 808. If (at block 904) the availability score or severity level (if a severity level is calculated) for the specified storage server is associated with a highest severity level, then the cloud management software 804 migrates (at block 906) critical computational services 812 from the specified storage system to at least one other available storage server $806_1$, $806_2$ . . . $806_n$. In one embodiment, where the availability score is used, the cloud management software 804 may maintain a mapping of possible availability score values to different severity levels to determine whether a particular availability score indicates migration should occur. From the no branch of block 904 or block 906, if (at block 908) the availability score or severity level (if a severity level is calculated) for the specified storage server is associated with a medium or higher than medium severity level, then the cloud management software 804 migrates (at block 910) semi-critical computational services 812 from the specified storage system to at least one other available storage server $806_1$, $806_2$ . . . $806_n$. From the no branch of block 908 or block 910, if (at block 908) the availability score or severity level (if a severity level is calculated) for the specified storage server is associated with a low or higher than low severity level, then the cloud management software 804 migrates (at block 914) customer data 810 from the specified storage system to at least one other available storage server $806_1$, $806_2$ . . . $806_n$.

If (from the no branch of block 912) the severity level is non-severe and if (at block 916) computational services (critical or semi-critical) and/or data was previously migrated from the specified storage system to the at least one available storage system, then those migrated computational services and/or data are migrated (at block 918) back from the at least one available storage system to the specified storage system.

Figure 10:
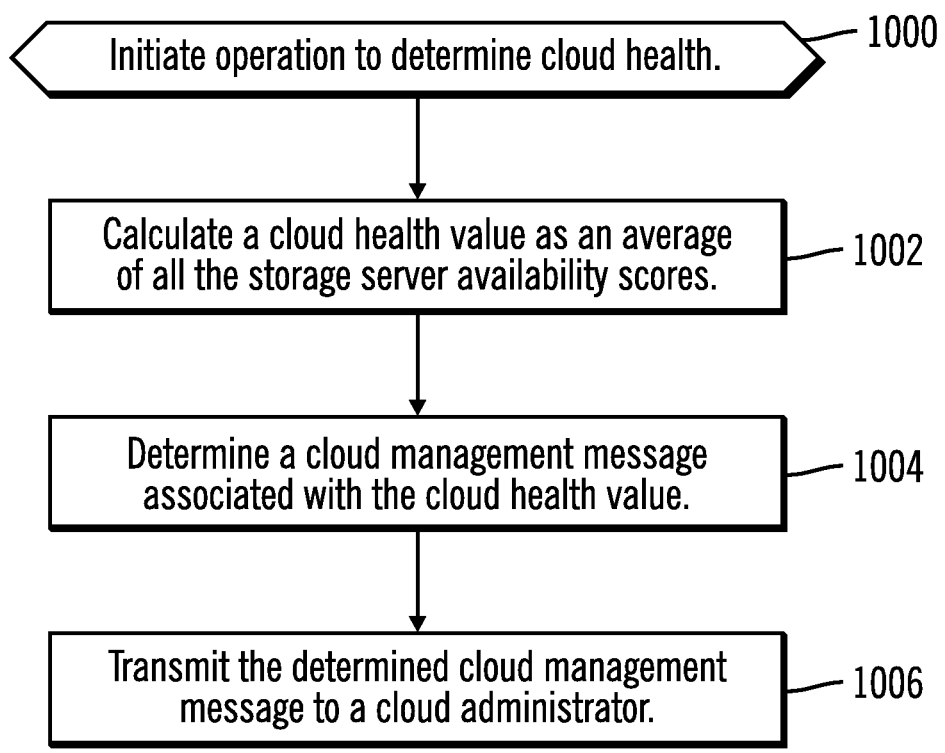
FIG. 10 illustrates an embodiment of operations to determine cloud health.

FIG. 10 illustrates an embodiment of operations performed by the cloud management software 804 to manage the overall health of the storage servers $806_1$, $806_2$ ... $806_n$ in the cloud 800. Upon initiating (at block 1000) an operation to determine the cloud 800 health, the cloud management software 804 calculates (at block 1002) a cloud health value as an average of all the storage server $806_1$, $806_2$ ... $806_n$ availability scores, such as the most recent availability scores maintained in the server availability information 808. A determination is then made (at block 1004) of a cloud management message associated with the cloud health value and the determined message is transmitted to a cloud administrator 1006. For instance, if the health value is below a low threshold, then an emergency message may be sent to the administrator to take immediate action to provide maintenance to the components in the cloud 800. Different other messages may be provided for other severity levels suggesting different diagnostic actions.

The described embodiments provide techniques to monitor the health status of storage systems or servers in a storage environment or cloud environment. The health status is determined from an aggregation of the availability of resources of different resource types in the storage system that are needed to provide access to the underlying services and data provided by the storage system. If the availability score indicates a severe level, based on the status of all the resources of the resource types and in certain embodiments a percentage or number of recovery events, then corrective action may be taken, such as by performing a failover from the storage system having a severe availability score to a secondary storage system providing a mirror copy of the data in the primary storage system. Further, in cloud environments, the corrective action may comprise migrating computational services and customer data from the storage server having a severe availability score to other storage servers in the cloud environment.

The reference characters used herein, such as i and n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
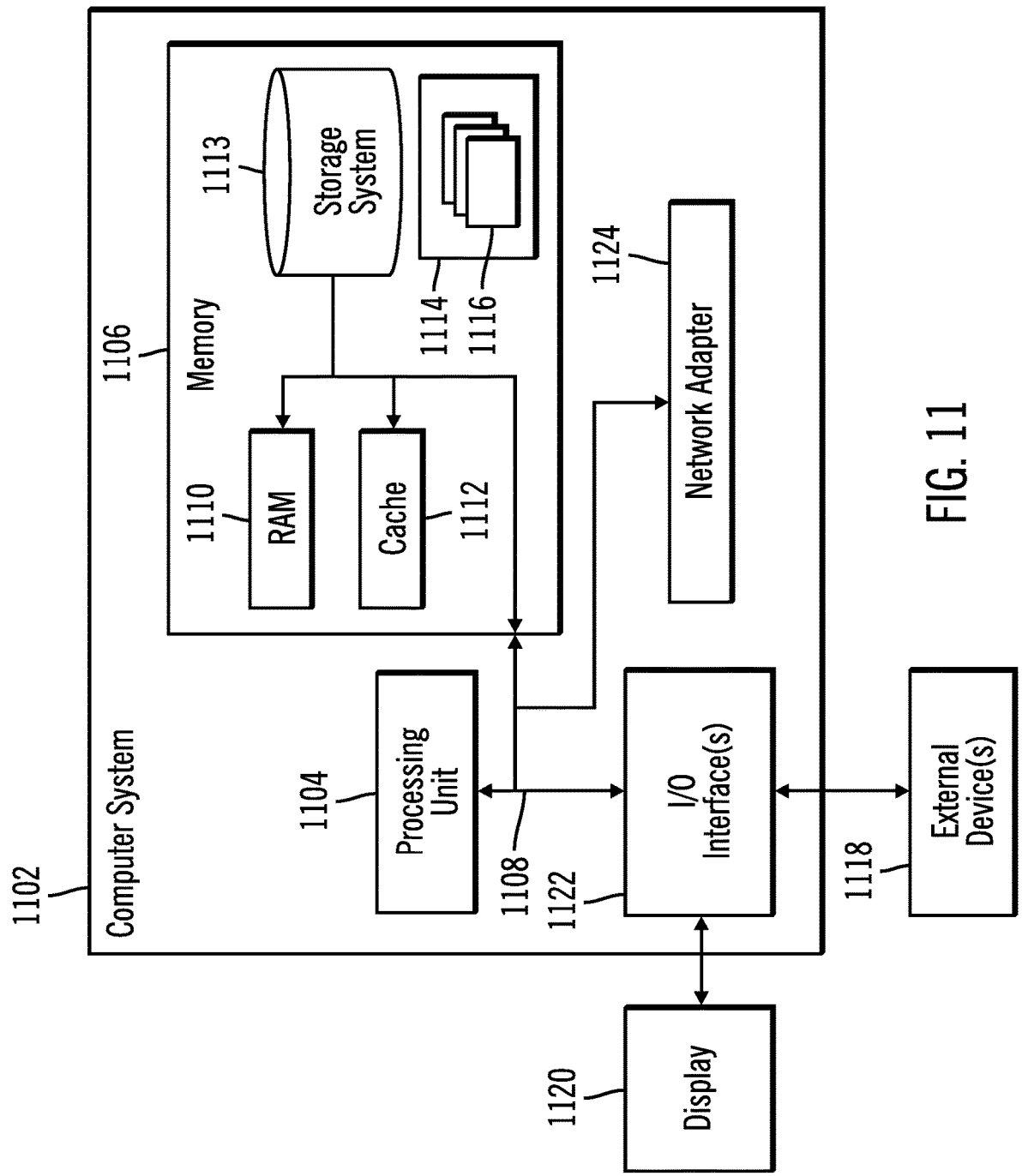
FIG. 11 illustrates a computing environment in which the components of FIGS. 1 and 8 may be implemented.

The computational components of FIGS. 1 and 8, including the host 100, primary 200a and secondary 200b storage systems, management system 802, and storage servers $806_1$, $806_2 \ldots 806_n$ may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

Figure 12:
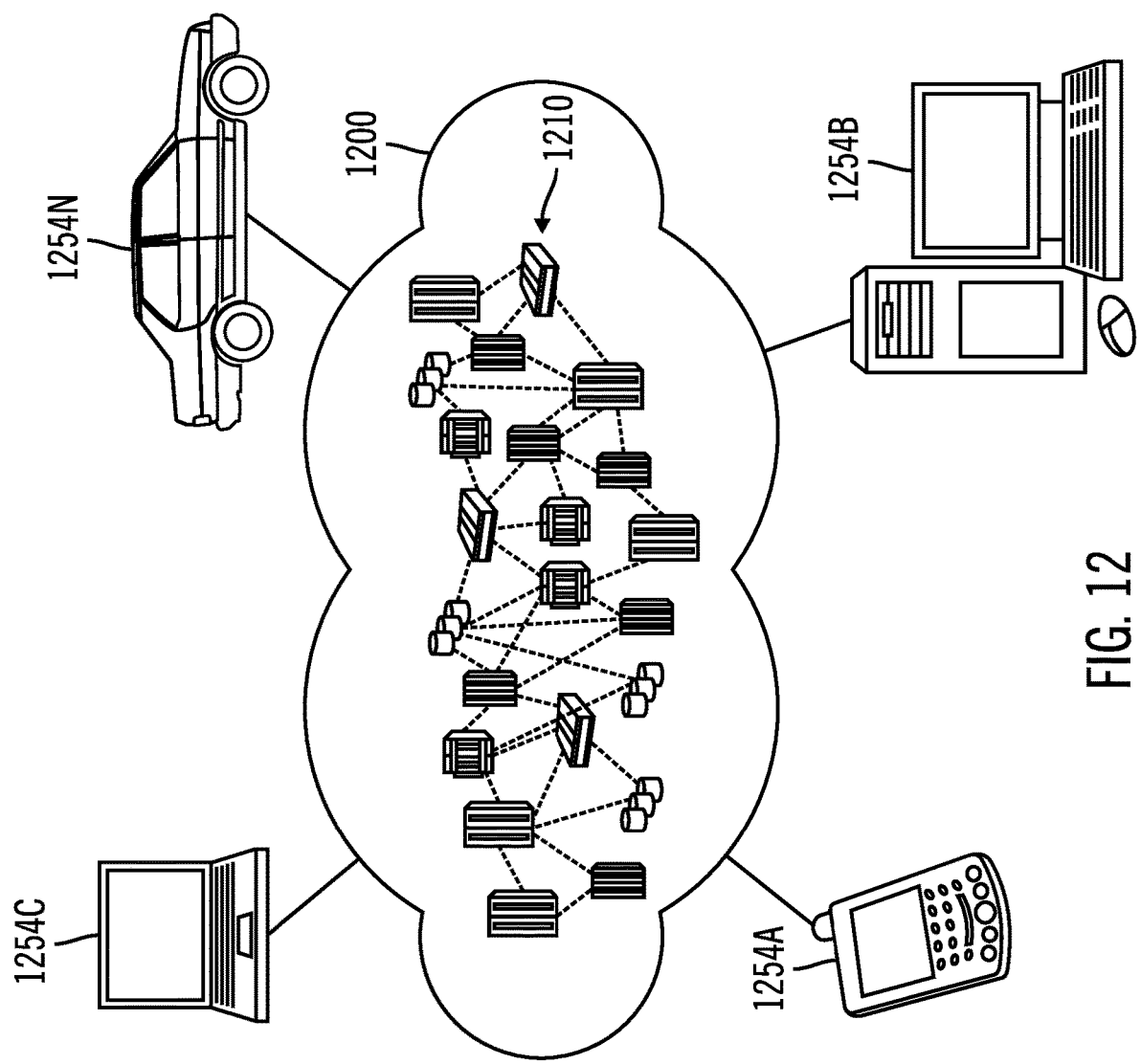
FIG. 12 illustrates an embodiment of a cloud computing environment.

Referring now to FIG. 12, illustrative cloud computing environment 1200 is depicted. As shown, cloud computing environment 1200 comprises one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1200 can communicate with any type of computerized device over any type of network and/or network addressable connection (e.g., using a web browser).

Figure 13:
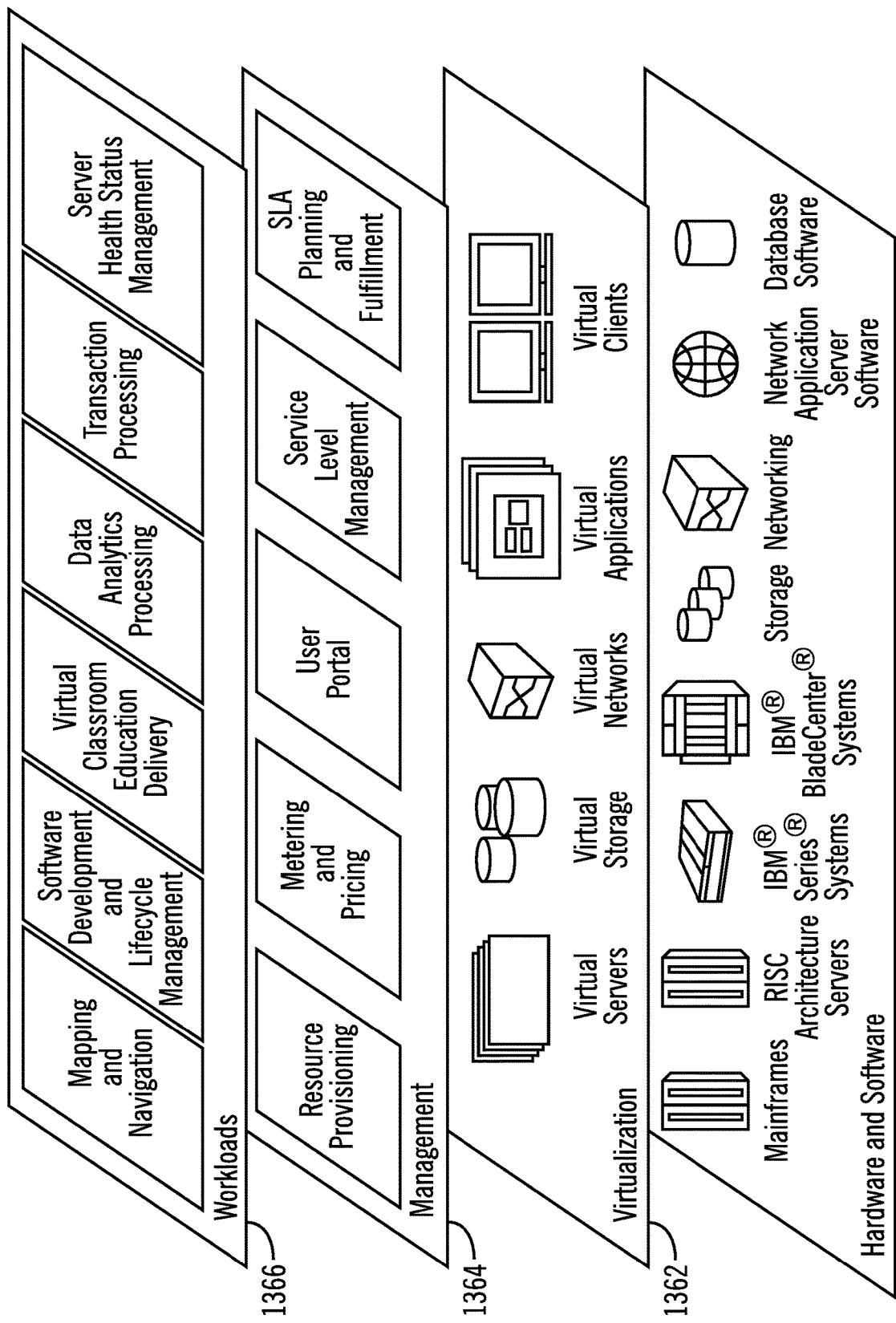
FIG. 13 illustrates an embodiment of functional abstraction layers in the cloud computing environment.

Referring now to FIG. 13, a set of functional abstraction layers provided by cloud computing environment 1200 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1362 provides an abstraction layer from which the following examples of virtual entities may be provided: virtual servers; virtual storage; virtual networks, including virtual private networks; virtual applications and operating systems; and virtual clients.

In one example, management layer 1364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and server health status management as described with respect to FIGS. 8-10 above.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining a health status of a first server in a network including a second server, wherein the computer program product comprises a computer readable storage medium having program code executed in the first server to perform operations, the operations comprising:
  receiving an error message for a resource;
  calculating an availability score as a function of a number of available resources at the first server and a number of recovery events at the first server; and
  performing a failover from the first server to the second server in response to the availability score having a severity level indicating a system failure.

2. The computer program product of claim 1, wherein the operations further comprise:
  transmitting information on the availability score to a management program in a management system in the network to use to determine whether to perform the failover.

3. The computer program product of claim 1, wherein the operations further comprise:
  performing a failback from the second server to the first server in response to the failover from the first server to the second server and the availability score not comprising the severity level indicating the system failure.

4. The computer program product of claim 1, wherein the function for calculating the availability score additionally considers a total number of resources at the first server and a total number of allowed recovery events at the first server.

5. The computer program product of claim 4, wherein the function calculates the availability score by combining a percentage of the number of available resources to the total number of resources and a percentage of the number of recovery events divided by the total number of allowed recovery events.

6. A system in communication with a remote server over a network, comprising:
  a processor; and
  a computer readable storage medium having program code executed to perform operations, the operations comprising:
    receiving an error message for a resource;
    calculating an availability score as a function of a number of available resources at the system and a number of recovery events at the system; and
    performing a failover from the system to the remote server in response to the availability score having a severity level indicating a system failure.

7. The system of claim 6, wherein the operations further comprise:
  transmitting information on the availability score to a management program in a management system in the network to use to determine whether to perform the failover.

8. The system of claim 6, wherein the operations further comprise:
  performing a failback from the remote server to the system in response to the failover from the system to the remote server and the availability score not comprising the severity level indicating the system failure.

9. The system of claim 6, wherein the function for calculating the availability score additionally considers a total number of resources at the system and a total number of allowed recovery events at the system.

10. The system of claim 9, wherein the function calculates the availability score by combining a percentage of the number of available resources to the total number of resources and a percentage of the number of recovery events divided by the total number of allowed recovery events.

11. A method for determining a health status of a first server in a network including a second server, comprising:
  receiving an error message for a resource;
  calculating an availability score as a function of a number of available resources at the first server and a number of recovery events at the first server; and
  performing a failover from the first server to the second server in response to the availability score having a severity level indicating a system failure.

12. The method of claim 11, further comprising:
  transmitting information on the availability score to a management program in a management system in the network to use to determine whether to perform the failover.

13. The method of claim 11, further comprising:
  performing a failback from the second server to the first server in response to the failover from the first server to the second server and the availability score not comprising the severity level indicating the system failure.

14. The method of claim 11, wherein the function for calculating the availability score additionally considers a total number of resources at the first server and a total number of allowed recovery events at the first server.

15. The method of claim 14, wherein the function calculates the availability score by combining a percentage of the number of available resources to the total number of resources and a percentage of the number of recovery events divided by the total number of allowed recovery events.

* * * * *